United States Patent
Gülen

(10) Patent No.: US 9,249,723 B2
(45) Date of Patent: Feb. 2, 2016

(54) TURBO-COMPOUND REHEAT COMBINED CYCLE POWER GENERATION

(71) Applicant: Bechtel Power Corporation, Frederick, MD (US)

(72) Inventor: Seyfettin C. Gülen, Middletown, MD (US)

(73) Assignee: Bechtel Power Corporation, Frederick, MD (US)

( * ) Notice: Subject to any disclaimer, the term of this patent is extended or adjusted under 35 U.S.C. 154(b) by 36 days.

(21) Appl. No.: 14/304,089

(22) Filed: Jun. 13, 2014

(65) Prior Publication Data
US 2015/0361877 A1    Dec. 17, 2015

(51) Int. Cl.
| F02B 63/00 | (2006.01) |
| F02B 73/00 | (2006.01) |
| F02C 6/12 | (2006.01) |
| F02B 77/13 | (2006.01) |
| F02B 63/04 | (2006.01) |
| F02B 75/16 | (2006.01) |

(52) U.S. Cl.
CPC . *F02B 73/00* (2013.01); *F02C 6/12* (2013.01); *F02B 63/04* (2013.01); *F02B 63/044* (2013.01); *F02B 75/16* (2013.01); *F02B 77/13* (2013.01); *F02B 2063/045* (2013.01)

(58) Field of Classification Search
CPC .. F02B 63/04; F02B 2063/045; F02B 63/044; F02B 77/13; F02B 75/16
USPC .......................................................... 123/2
See application file for complete search history.

(56) References Cited

U.S. PATENT DOCUMENTS

| 2,468,157 A | | 9/1946 | Barlow et al. |
| 4,742,683 A | * | 5/1988 | Heminghous ........... F02B 41/10 60/624 |
| 5,146,756 A | * | 9/1992 | Lavin ................... F25J 3/04157 62/646 |
| 2005/0056001 A1 | | 3/2005 | Frutschi et al. |

(Continued)

FOREIGN PATENT DOCUMENTS

| EP | 2711523 A1 | 3/2014 |
| WO | 2012080770 A1 | 6/2012 |

OTHER PUBLICATIONS

Gülen, S.C., 2013, "Constant Volume Combustion: The Ultimate Gas Turbine Cycle," Gas Turbine World, Nov./Dec. 2013, pp. 20-27.

(Continued)

*Primary Examiner* — Lindsay Low
*Assistant Examiner* — Charles Brauch
(74) *Attorney, Agent, or Firm* — Duane Morris LLP

(57) ABSTRACT

A power generation plant has two internal combustion engines (ICE) coupled in a compound configuration to operate electrical generators. A first ICE is a piston/cylinder engine producing high temperature and high pressure exhaust. The exhaust is coupled to the combustion air inlet of the second ICE, which is a gas turbine engine. A heat exchanger transfers heat from the exhaust of the first ICE to a bottoming cycle for additional power generation, also reducing the temperature at the turbine engine combustor. The second ICE (the gas turbine) is operated without an intake compressor, relying instead on the high pressure of the first ICE exhaust. The drive shaft of the gas turbine (or an associated generator/motor or a common shaft) operates a multi-stage turbo-compressor at the combustion air intake of the first ICE for improving engine power output without sapping exhaust energy as with a turbocharger.

16 Claims, 9 Drawing Sheets

(56) References Cited

U.S. PATENT DOCUMENTS

| | | |
|---|---|---|
| 2007/0130952 A1 | 6/2007 | Copen |
| 2008/0216510 A1* | 9/2008 | Vandor .................... F02C 6/16 62/600 |
| 2009/0000294 A1* | 1/2009 | Misselhorn ........... F02G 1/0436 60/517 |
| 2013/0174816 A1 | 7/2013 | Riley et al. |

OTHER PUBLICATIONS

Gülen, S.C., 2010, "Gas Turbine with Constant Volume Heat Addition," ESDA2010-24817, Proceedings of the ASME 2010 10th Biennial Conference on Engineering Systems Design and Analysis, Jul. 12-14, 2010, Istanbul, Turkey.

Tsuji, T., 2005, "Cycle Optimization and High Performance Analysis of Engine—Gas Turbine Combined Cycles," GT2005-68352, ASME Turbo Expo 2005, Reno-Tahoe, NV, USA, Jun. 6-9, 2005.

Tsuji, T., 2007, "Performance Analysis on Gas Engine—Gas Turbine Combined Cycle Integrated with Regenerative Gas Turbine," GT2007-27198, ASME Turbo Expo 2007, Montreal, Canada, May 14-17, 2007.

Payrhuber, K., Chvatal, D., Rapp, C., 2011, "The new J920 gas engine," PowerGen Europe, Jun. 7-9, 2011, Milan, Italy.

Hall, J.M., Thatcher, R.T., et al., 2011, "Development and Field Validation of a Large-Frame gas Turbine Power Train for Steel Mill Gases," GT2011-45923, ASME Turbo Expo 2011, Vancouver, Canada, Jun. 6-10, 2011.

Otsuka, H., Tanaka, S., et al., 2007, "Anshan Iron & Steel Group Corporation, China, Construction and Operation Experience of 300 MW Blast Furnace Gas Firing Combined Cycle Power Plant," MHI Technical Review vol. 44 No. 4 (Dec. 2007).

Wideskog, M., 2011, "Introducing the world's largest gas engine," Wärtsilä Technical Journal, Jan. 2011, p. 14-20 (Jan. 2011).

J920 FleXtra Sales Brochure, GEA-18363US, "Now you can have it all—more innovation, power & efficiency. Lasting power with the incredible new 10 MW range Jenbacher gas engine," GE Jenbacher GmbH & Co OG (2013).

GE Energy Sales Brochure, GEA-12985H, "Heavy duty gas turbine products," General Electric Company (Jun. 2009).

International Search Report and Written Opinion, Apr. 22, 2015, in PCT/US2014/065694.

* cited by examiner

TURBO-COMPOUND REHEAT COMBINED CYCLE POWER GENERATION

FIELD OF THE INVENTION

The invention concerns generating mechanical and/or electric power using fuel combustion engines and steam turbines.

BACKGROUND

Internal combustion engines can be classified into two major categories based on the heat addition portion of their respective thermodynamic cycles: "constant volume" and "constant pressure" heat addition engines (cycles). For example, see Gülen, S. C., 2013, "Constant Volume Combustion: The Ultimate Gas Turbine Cycle," Gas Turbine World, November/December 2013, pp. 20-27. Either process is an idealized conceptualization of the actual fuel-air combustion that takes place inside the actual engine. In particular, Constant volume heat addition is closely approximated by the combustion of a fuel-air mixture within the cylinders of a reciprocating or piston engine, e.g., a car or truck engine.

Constant pressure heat addition is closely approximated by the combustion of a fuel-air mixture inside the combustor of a gas turbine.

Thermodynamic cycle analysis, whether using the idealized air-standard approach or "real fluid or gas" approach, demonstrates the superiority of constant volume heat addition or combustion process in terms of cycle thermal efficiency. See also, Gülen, S. C., 2010, "Gas Turbine with Constant Volume Heat Addition," ESDA2010-24817, Proceedings of the ASME 2010 10th Biennial Conference on Engineering Systems Design and Analysis, Jul. 12-14, 2010, Istanbul, Turkey. A reason for that, in layman's terms, is that constant volume combustion is a confined chemical explosion, with simultaneous increase of temperature and pressure of the working fluid. Other things being equal, this leads to better thermal efficiency because part of the compression is achieved within the heat addition part of the cycle and, for the same amount of heat addition, leads to higher net cycle power output (less compression work).

In terms of practical applications, these advantages are inherent efficiencies of modern gas fired reciprocating engine gen-sets (e.g., Wärtsila's 18V50SG) that are nearly 50% efficient (compared to around 40% for modern heavy-duty industrial gas turbines or 45% for smaller aeroderivative units with high cycle pressure ratios).

Efforts to exploit constant volume combustion (CVC) in the context of gas turbines goes back to Holzwarth's explosion turbine in the early years of the 20th century. The intermittent nature of CVC combustion within a confined space (similar to the "explosion" of fuel in an engine cylinder in the space between the piston and cylinder head), is contrary to the continuous flow nature of turbine combustion generally, characterized by combustion in an "open system" as part of a steady-state steady-flow (SSSF) process. As a result, CVC has dropped off the evolutionary trajectory of gas turbine technology for land-based electric power generation.

Similar ideas have persisted with respect to aircraft propulsion. A specific version of quasi CVC in this context is known as "pulse detonation combustion". The engine comprising the pulse detonation combustor is known as a "pulse detonation engine" (PDE), discussed in Gülen, supra. As the name suggests, the concept involves creation of a detonation wave within a semi-closed tube filled with a fuel-air mixture. The resulting wave simultaneously compresses and heats the mixture, which is discharged into an axial turbine. The same dichotomy mentioned above, namely a "steady flow open system" versus an "intermittent flow closed system," results in mechanical design difficulties, which so far have prevented the transition of PDE or similar CVC concepts into viable commercial products.

While CVC has not been commercialized as an integral part of a gas turbine engine (or cycle), the two types of internal combustion processes and respective engines (piston and turbine) have been tried in a "compound" system with some success. Early examples of "turbocompound" engines are Allison's V-1710-127(E27) and the Napier Nomad aircraft engine. Development of Allison's engine began in 1943 to power the Bell P-63H airplane. Both the engine and the airplane were built, but they were never flown due to the end of the war and the introduction of jet engines. The engine was rated at 3090 bhp at 3200 rpm and 28,000 feet, with a manifold pressure of 100 inHgA (~50 psia) and an impressive specific fuel consumption rate of 0.365 lb/bhp-hr.

Developed in the UK in 1950s, the Nomad comprised a 12-cylinder two-stroke diesel engine in two six-cylinder blocks, also serving as a gas generator for a gas turbine. Both the diesel engine and the gas turbine contributed shaft power to a propeller, via a complicated gear arrangement. Nomad was considered the most efficient internal combustion engine flown, with less than 0.35 lb/bhp-hr in flight delivering about 3,000 bhp.

Despite the fuel efficiency offered by turbocompound engines, the aircraft industry bypassed them in favor of rapidly emerging gas turbines. Many factors played into the shift in the aviation industry, including weight/thrust ratio, cost, reliability, operational speed, fuel costs, etc. The technology is applied to land-based propulsion. For example, turbocompound diesel engines power some Scania (formerly Saab) trucks.

A turbocompound engine should not be confused with a "turbocharged" engine. A turbocharger is fundamentally different. In a turbocharged engine, exhaust gas coupled through a turbine operates a compressor unit to compress combustion air before it enters the engine cylinders. The turbocharger is merely an accessory for the piston engine, used to increase the working fluid mass for increased shaft power from the piston engine. In the turbocompound arrangement, a gas turbine is an "equal partner" with its reciprocating/piston counterpart. Both the piston engine and the turbine contribute to total shaft power generation.

A turbocompound gas turbine combined cycle concept has been proposed by Tsuji, T., 2005, "Cycle Optimization and High Performance Analysis of Engine-Gas Turbine Combined Cycles," GT2005-68352, ASME Turbo Expo 2005, Reno-Tahoe, Nev., USA, Jun. 6-9, 2005; and Tsuji, T., 2007, "Performance Analysis on Gas Engine-Gas Turbine Combined Cycle Integrated with Regenerative Gas Turbine," GT2007-27198, ASME Turbo Expo 2007, Montreal, Canada, May 14-17, 2007. The concept is named alternatively as an Engine Turbo-Compound System (ETCS), or as an Engine Reheat Gas Turbine (ERGT)

The ETCS/ERGT concept involves gas turbine exhaust gas heat recovery via a heat recovery steam generator (HRSG) for additional power generation in a steam turbine (ST). As such, it is a combined cycle system. In particular, ETCS is a true turbocompound concept where the two distinct internal combustion engines are separate entities in their own right as shown in FIG. 1 (labeled prior art).

Briefly, the ETCS system shown in FIG. 1 comprises a modified gas turbine gen-set GT and a modified gas engine gen-set GE. As to the modified gas turbine: Suction air is supplied at inlet 1 to compressor C. A portion of the compressed air from the discharge 2 of compressor C is sent to the gas engine GE after first being cooled in a heat exchanger (HX). Gas engine GE is a gas-fired reciprocating (piston-cylinder) engine in the gen-set with generator GEN2. Exhaust gas from gas engine GE is piped at exhaust 4 back to the gen-set including gas turbine GT, namely through a combustor (CB) inlet after having been mixed with compressed air bypassing the GE.

The modified gas engine GE does not have a turbocharger as an inlet accessory, but part of the air from outlet 2 of compressor C is coupled to the inlet 3 of gas engine GE, providing an intake charging function. Another result of intake charging to gas engine GE is that the exhaust gas at 4, coupled to the inlet 5 of turbine T in the gas turbine gen-set GT, is at a pressure high enough to satisfy the turbine (T) requirements.

The Tsuji ETCS is an integrated system, and might possibly be produced by combining and modifying "off-the-shelf" GT and a GE units to include various additional piping, heat exchangers, generators and other elements so as to interact as desired. The Tsuji ERGT is more an explanation of a conceptual model to address the thermodynamics underlying the ETCS system. These disclosures are characterized by double combustion as shown in FIG. 1, first in the gas engine cylinders (note fuel flow $f_2$) and then in the combustor CB of the gas turbine (fuel flow $f_1$), namely a "reheat" concept implicit in the ETCS. The reported ETCS performance is summarized in the following Table 1, which compares expected performance of ETCS configurations of substantially different sizes:

TABLE 1

| ETCS PERFORMANCE (Tsuji, T.) | | |
|---|---|---|
| | ETCS (1) | ETCS (2) |
| Type and Number of Gas Turbine and Gas Engine | 6 MW-Class GT × 1 (TIT 1150° C.) Gas Engine × 2 (900° C. Exhaust) Power Output | 150 MW-Class GT × 1 (TIT 1350° C.) Gas Engine × 2 (900° C. Exhaust) |
| Gas Turbine | 6,700 kW | 160,400 kW |
| Gas Engine | 11,500 kW | 200,100 kW |
| Steam Turbine | 4,000 kW | 99,100 kW |
| ETCS | 22,200 kW | 459,600 kW |
| Thermal Efficiency (Gross, LHV Base) | | |
| ETCS | 49.8% LHV | 56.7% LHV |

SUMMARY

It is an object of the invention to provide methods and apparatus for efficient generation of electrical and/or mechanical power. One point is to exploit operational aspects of a quasi-constant volume type fuel combustion engine, especially in a piston/cylinder internal combustion engine, while efficiently recovering energy from the engine exhaust. In various embodiments, distinctly different types of discontinuous and steady flow combustion elements (especially reciprocating piston engines and turbines configured as compressors and as energy extracting expanders) are coupled mechanically and in air, combustion gas and heat flow paths to operate in a compound manner. By compressing and expanding gases, combusting fuel and moving heat energy in the turbo-compound combined cycle power generation system as described herein (including reheating and preferably a bottoming cycle), an overall system thermal efficiency is brought to about 60%.

Specific practical examples are disclosed. In one embodiment, a commercially available large displacement Wärtsila piston engine and a General Electric E class gas turbine are compounded. Modifications include removing the compressor of the gas turbine and adding a turbo-compressor at the combustion air intake of the piston engine. The piston engine is operated at high gas pressure and produces a high gas pressure exhaust. This piston engine exhaust is coupled to the intake of combustor feeding the gas turbine. A heat exchanger preferably extracts heat from the high pressure exhaust of the piston engine from which additional work is extracted by a bottoming cycle.

More generally, a compound internal combustion engine (ICE) power plant is operated with two combustion stages. A constant volume exhaust flow from the second ICE, e.g., a gas turbine exhaust, provides energy to a bottoming cycle for additional power generation.

The first ICE is advantageously a reciprocating piston-cylinder type engine, i.e., characterized by quasi constant volume combustion in cylinders. By compound operation including turbo-compression at the first ICE intake, high pressures and temperatures are achieved in the exhaust from the first ICE and exploited further on, including by the second ICE.

Advantageously, the second ICE can comprise a combustor and gas turbine. No gas turbine compressor is required to boost the pressure of the combustion gas (including the high pressure exhaust of the first ICE). The gas turbine extracts energy by expanding the combustor exhaust flow. The exhaust from the gas turbine is at a temperature and pressure substantially lower than that of the first ICE. In this way much of the energy available from the fuel has been extracted. A bottoming cycle can extract additional power from the remaining heat energy and/or pressure.

Moreover, a heat exchanger can be provided between the first and second ICE to extract heat from the exhaust gas from the first ICE while preserving the high pressure of the exhaust gas. Energy from the heat exchanger can generate vapor or add heat to the particular working fluid used for additional power generation in the bottoming cycle.

Supercharged intake air for the first ICE and the hot gas path component cooling air for the second ICE are provided by a separate turbo compressor, which can be of an intercooled centrifugal or axial type.

BRIEF DESCRIPTION OF THE DRAWINGS

The drawings show a number of embodiments, attributes and alternatives to illustrate the invention generally and in specific examples. It should be understood that the invention is not limited to the embodiments used as examples, but is capable of variation within the scope of the appended claims. In the drawings, FIG. 1 (labeled "prior art") is a block diagram showing components of an Engine Turbo-Compound System (ETCS) as disclosed in Tsuji, T., 2005, "Cycle Optimization and High Performance Analysis of Engine-Gas Turbine Combined Cycles," GT2005-68352, ASME Turbo Expo 2005, June 2005, discussed in the background.

DETAILED DESCRIPTION OF EXEMPLARY EMBODIMENTS

According to the present disclosure, distinctly different types of combustion apparatus are each modified, interfaced and operated with additional energy recovery features. The combustion apparatus complement one another and the efficiency of overall energy recovery is quite good. A first internal combustion engine (ICE) comprises a reciprocating piston engine, exploited for quasi-constant volume combustion (with the combustion of fuel leading to increased pressure and temperature within a volume). The pressure at the intake to the first ICE is elevated by a turbo-compressor driven by the compound apparatus. The piston engine is operated at a high fuel combustion energy level. The pressure and temperature of the piston engine exhaust are elevated by the fuel combustion and coupled to the intake of a second internal combustion engine that comprises a fuel combustor and a gas turbine.

The second ICE (the gas turbine) operates at quasi-constant pressure (the fuel combustion leads to expanding volume and continuous flow). A heat exchanger is provided along the working combustion gas flow path from the exhaust of the first ICE (piston engine) to the intake of the second ICE (gas turbine). This heat exchanger extracts heat from pressurized the exhaust of the first ICE to obtain temperature and pressure conditions that are apt for the combustor and gas turbine of the second ICE. In particular, the temperature is reduced to less than the spontaneous ignition temperature of the fuel used in the second ICE, such as natural gas (primarily methane). The heat energy extracted by the heat exchanger, plus residual heat energy at the exhaust of the second ICE, are extracted in a bottoming cycle. The bottoming cycle can comprise a heat recovery steam or other vapor generator from which mechanical energy is extracted by a steam or vapor turbine. The two distinct ICEs provide a compound power generation configuration and with the bottoming cycle provide combined cycle power generation. The power can ultimately be used to produce electric power using one or several rotating electric power generators on shafts coupled directly or through transmissions to the piston ICE, the gas turbine ICE and the bottoming cycle steam or vapor turbine. The shaft power likewise operates a turbine compressor at the intake of the piston ICE, providing for turbo-compounding the two ICEs.

Figure 1:
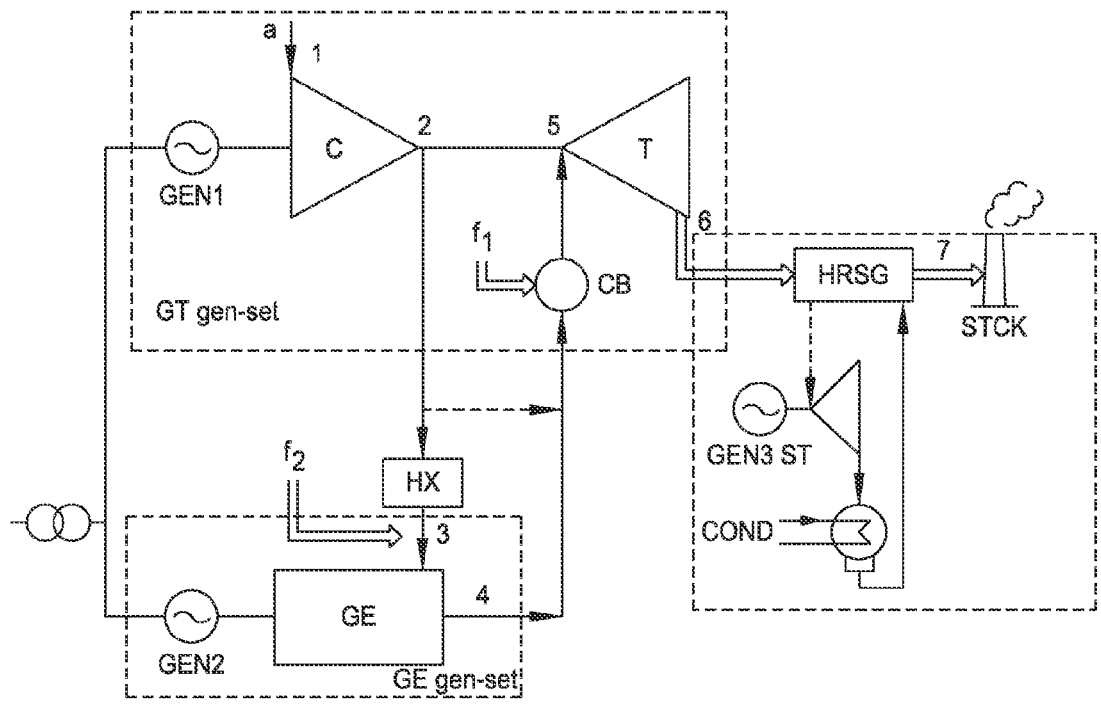
Figure 2:
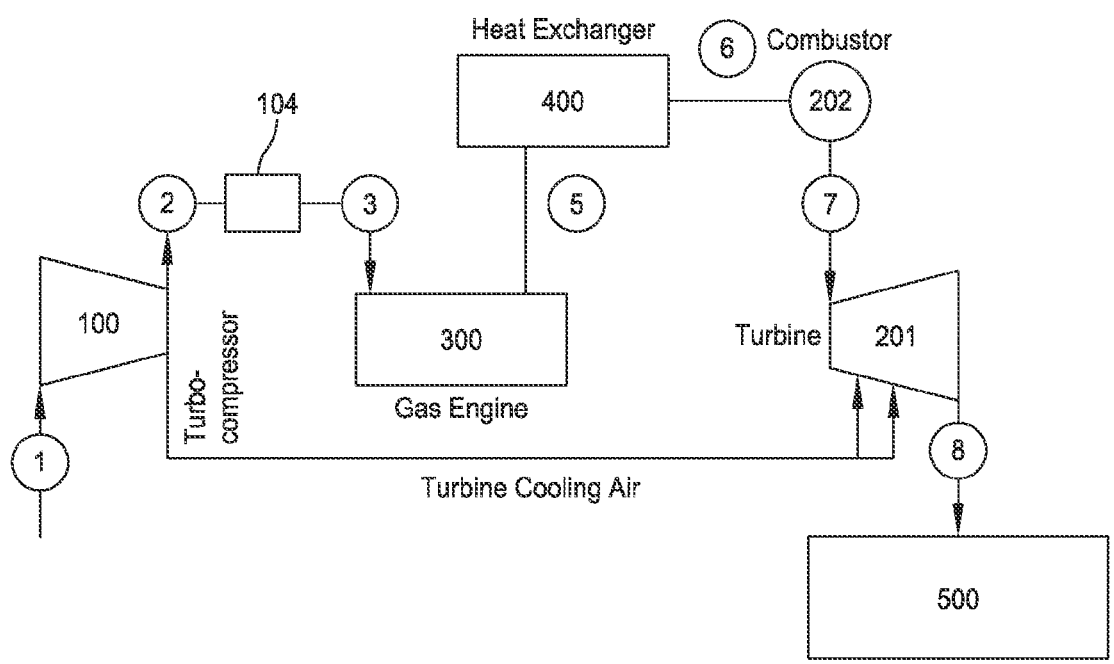
FIG. 2 is a simplified block diagram showing the basic elements of an embodiment of the present invention.
Figure 4:
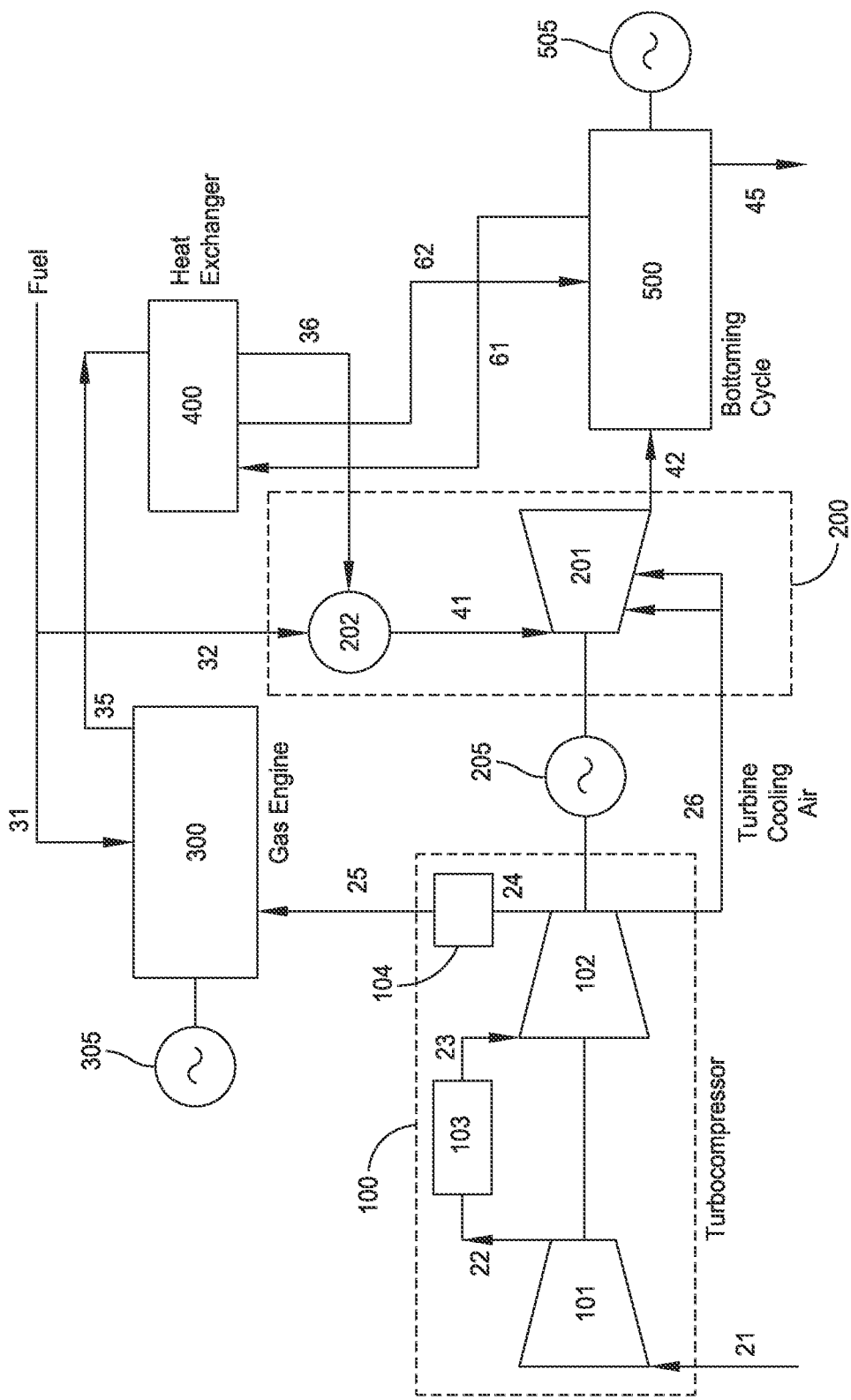
FIG. 4 is a detailed block diagram showing an exemplary embodiment of the present invention.

A basic configuration is shown in FIG. 2, and a more detailed illustration is found in FIG. 4. A turbo-compound reheat gas turbine combined cycle power generation apparatus is shown with three equipment elements, namely a turbo-compressor (TC) 100, a gas engine 300, and a gas turbine 201/202. The gas engine 300 advantageously is an advanced piston/cylinder gas engine with the original equipment turbocharger removed. Examples are Wärtsila model 18V50SG and GE Jenbacher model J920. In each example, the piston/cylinder engine is modified by removal of its turbocharger. The intake compression function at the piston/cylinder engine is served by the turbo compressor 100, which is driven by the gas turbine engine.

The gas turbine advantageously is an industrial (heavy duty) gas turbine such as a GE model 7EA. Likewise, the original equipment compressor section of the gas turbine is removed. Intake compression to the combustor 202 of the gas turbine is provided by compression of the exhaust from the piston/cylinder engine, which is inherent in a quasi-constant volume combustion engine, namely with pistons and cylinders. The piston engine 300 also operates efficiently with a pressurized intake, and the intake to the piston engine 300 is compressed by the turbo-compressor 100, which can be driven by shaft torque from the gas turbine 200.

According to the disclosed embodiments, fuel combustion in the piston/cylinder engine (at quasi-constant volume conditions) elevates temperature and fluid pressure, further boosted by the turbo-compressor 100, disposed at the inlet to the piston cylinder engine and supplanting the need for a turbocharger. Fuel combustion at a combustor 202 adds further temperature and pressure to the exhaust flow, and energy is extracted from the flow by gas turbine 201, which does not require an inlet compressor because the exhaust from piston engine 300 is already pressurized. The combustor 202 and gas turbine 201 exploit the fluid pressure at quasi-constant pressure conditions as the expanding combustion product flows through the nozzles and buckets of the turbine and thus apply torque to a drive shaft.

The turbo-compressor 100 provides air intake compression (at node 1 in FIG. 2), but rather than being driven by extracting pressure/flow energy from the engine exhaust flow to compress the intake air, like a conventional turbocharger, the turbo-compressor 100 is driven from the power generated by the power generation unit, preferably from shaft torque (shaft depicted in FIG. 4). The turbo-compressor 100 can be a centrifugal unit coupled through an after-cooler 104 (at node 2) to the gas engine 300 (at node 3), or an axial unit may be provided without the inter-cooler 104. In an embodiment illustrated by FIGS. 3 and 4, two or more staged turbo-compressors are provided with intercoolers (see 103 in FIG. 4) or after-coolers 104 (FIG. 2) disposed to reduce the temperature of the compressed combustion gas at each stage, while preserving the intake pressure.

Air compressed in the turbo-compressor 100 is sent to the gas engine 300 intake after being cooled to a suitable temperature (typically, 140-160° F.). Because the air is compressed by turbo-compressor 100, there is no need for an engine turbocharger on the piston engine 300.

Many modern, high efficiency gas engines are equipped with a one or two-stage compressor, with inter- and after-coolers, that are powered by an exhaust gas turbine in a turbocharger configuration. As discussed above, the turbochargers of the exemplary engines are advantageously removed and their function supplanted by compressor 100 and inter-cooler 104. It may alternatively be possible and advantageous to employ the intake compressor and inter- or after-coolers of the engine. However it is an aspect of this disclosure that for best efficiency, elevated engine exhaust pressure is to be maintained for coupling into the gas turbine 201, without extracting energy from the piston engine exhaust to drive a turbocharger. Instead, the compressor 100 is driven from shaft torque (such as from the engine 300 or turbine 201, directly or via an electric generator and motor paired arrangement). Some of the compressed air from compressor 100, with or without being after-cooled depending on the type of turbo-compressor), also can be coupled to turbine 201 for component cooling.

The gas engine 300 can burn natural gas fuel to generate mechanical power (torque). The exhaust of the gas engine at ~1,200° F. (650° C.) is coupled through a heat exchanger 400, where heat energy is extracted. That energy adds heat to the working fluid of a bottoming cycle 500. An example is high pressure steam production if the particular bottoming cycle is a Rankine steam cycle in a combined cycle arrangement that also extracts energy from the exhaust of gas turbine 201. The heat exchanger lowers the temperature of the exhaust gas, which is fed as combustion gas into the combustor 202 of the gas turbine arrangement.

Accordingly, initial working fluid pressure has been elevated by compressor 100, further elevated by gas engine 300, maintained through heat exchanger 400 to combustor 202, and exploited at gas turbine 201. The working fluid temperature has been managed by extraction of heat at heat exchanger 400. By extracting heat at heat exchanger 400, the flow gas temperature can be reduced from the gas engine exhaust temperature, which is as high as 900° C. (1,650° F.) in the working fluid coupled along the flow path toward the gas turbine combustor. That engine exhaust temperature is above the auto-ignition temperature of methane, the primary fuel component of natural gas (ignition temperature about 1,000° F.). Combustion gas at that temperature cannot be admitted to the gas turbine combustor 202 in a practical embodiment.

The exhaust gas from the piston engine 300 exits the heat exchanger 400 at about 900° F. The exhaust gas contains about 13% $O_2$ by volume. This gas is sent to the combustor 202 of gas turbine GT, which burns natural gas fuel in a quasi constant pressure process to generate hot gas for expansion in the turbine section 201 for power generation. The turbine section 201 is an adiabatic apparatus in that the expanding hot gas flows continuously through respective compressor nozzles and buckets at successively greater volume flow rates and lower pressures, expanding and applying mechanical torque to the compressor shaft while flowing through turbine section 201. Insofar as temperatures might be considered "hot" in this context, consider that the turbine inlet temperature (TIT) typical of E class units such as GE's Frame 7EA is 2,175° F. For early F class units, the TIT is 2,475° F. The exhaust gas from the turbine (typically a three-stage design with a nominal pressure ratio (PR) of 13) varies between 1,050° F. and 1,200° F. (maximum allowable) depending on the TIT and PR.

The bottoming cycle 500 uses the emerging exhaust gas to generate additional power, e.g., in a combined cycle involving steam generation and a steam turbine or otherwise. The bottoming cycle 500 is treated in this disclosure as a known ("black box") block element and is not treated in detail. A feasible example is a Rankine steam cycle comprising a heat recovery steam generator HRSG, a steam turbine ST, and various pipes, valves, pumps and heat exchangers that are conventionally included in known heat recovery and cogeneration applications. Superheated steam generated in the HRSG at two or three different pressure levels, is expanded in one or more ST units for additional power generation. Other bottoming cycle options are also possible.

Figure 3:
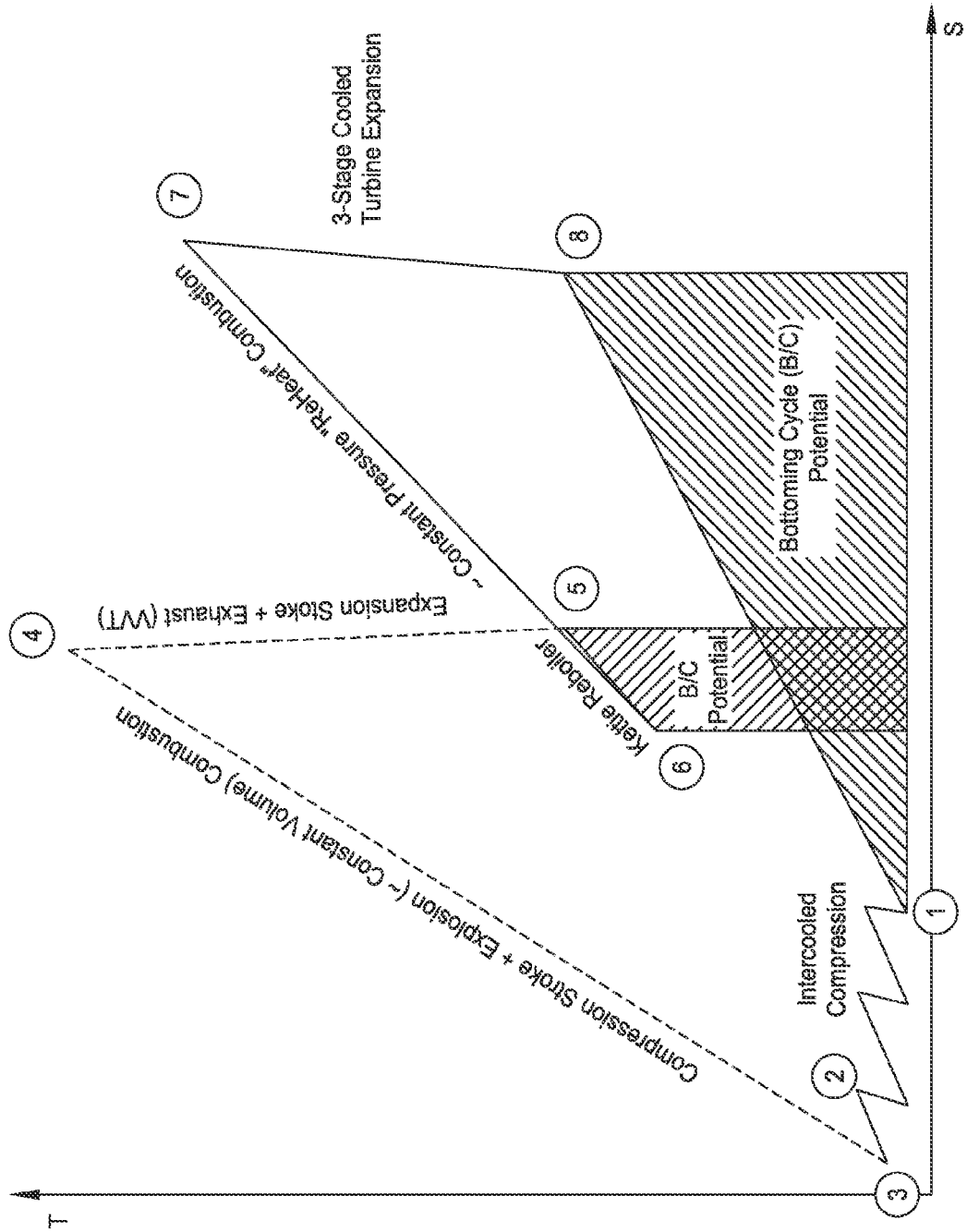
FIG. 3 is a temperature-entropy (T-s) cycle diagram wherein the numbers correspond to points along the working fluid flow path shown in FIG. 2. The cycle diagram assumes a three stage compressor and two intercoolers (proceeding from point 1 to point 2).

FIG. 3 is a temperature-entropy (T-s) diagram according to the configuration shown generally in FIG. 2 and in more detail in FIG. 4. The cusps in the T-s diagram are labeled to correspond to the points along the flow path of the working fluid in FIG. 2. However in FIG. 2 the after-cooler 104 is shown generally and in FIGS. 3 and 4, the details are consistent with turbo-compressor 100 having multiple compressor stages separated or followed by inter-coolers and after-coolers. FIG. 4 illustrates plural turbo-compressor stages 101, 102 coupled serially by flow connections 22, 23, 24 to coolers 103, 104 and thence along connection 25 to the air/gas inlet of engine 300. The other inlet is from fuel line 31 and the exhaust of engine 300 is coupled along line 35 to heat exchanger 400. FIG. 4 further illustrates the extraction of electrical power by electric generators 205, 305, 505, coupled on drive shafts (directly or indirectly by transmissions) to gas turbine 201 (which also drives turbo-compressor 100), gas engine 300 and bottoming cycle 500.

In one embodiment, the engine 300 and gas turbine 201 comprise a modified Wärtsila 18V50SG piston engine and a modified General Electric Frame 7EA gas turbine. Sample system performance calculations can be derived from the manufacturer specifications, except that as discussed above, the original equipment turbocharger of the piston engine and the compressor of the gas turbine are omitted. A preferably multi-stage turbo-compressor at the inlet of the gas engine 300 is driven by the gas turbine 201, providing the desired working fluid pressure conditions. These arrangements are further improved by the heat exchanger 400 for reducing the temperature of the intake to the combustor 202 of the gas turbine. Heat extracted there and residual heat from the gas turbine 201 are coupled in a combined cycle or similar configuration with the bottoming cycle unit 500.

The Wärtsila 18V50SG is a four-stroke, spark ignited gas engine that works according to the Otto principle and the lean-burn process. The normally turbocharged 18-cylinder engine runs at 514 rpm for 60 Hz applications, and produces 19,260 kW of shaft power. The electric power output is about 18.8 MW (with a generator/gearbox efficiency of 97.5%) for an overall thermal efficiency of 48.6% at the generator terminals. Engine NOx production is about 90 ppmvd (at 15% O2) with the stated performance. Lower emission can be achieved with some derating of performance.

General Electric Frame 7EA (new designation 7E 3-series) is an E class gas turbine with 2,055° F. firing temperature and a pressure ratio of about 13. It has an ISO base load efficiency of about 33.4% with about 89 MW net output at the generator terminals. Equipped with a DLN combustor, its NOx generation is 25 ppmvd. The 7EA has a unique rotor structure with three bearings and "hot end" generator drive. This makes it an apt subject for relatively straightforward modification to remove the compressor section and to integrate the combustor and gas expansion segments into the system disclosed herein. Salient performance characteristics of the gas engine and gas turbine are provided in the following Table 2.

TABLE 2

Original gas engine and gas turbine performance data

|  |  | 18V50SG | 7E 3-Series |
|---|---|---|---|
| Reference Condition | F | ISO 3046[1] | ISO 3977[2] |
| Fuel |  | Natural Gas[3] | 100% $CH_4$ |
| Electric Power | kW | 18,759 | 88,718 |
| Efficiency |  | 46.8% | 33.4% |
| Heat Rate | Btu/kWh | 7,291 | 10,216 |

TABLE 2-continued

Original gas engine and gas turbine performance data

|  |  | 18V50SG | 7E 3-Series |
|---|---|---|---|
| Exhaust Flow | lb/s | 68.3 | 644 |
| Exhaust Temperature | F | 707.0 | 1,019 |

1: 77° F., 30% relative humidity, 100 m above sea level
2: 59° F., 60% relative humidity, sea level
3: Gas Methane Number > 80

The system shown in FIG. 4 works as follows. Ambient air 21 at ISO 3046 conditions is compressed in turbo-compressor 100, which is an intercooled design with two sections, 101 and 102, and an intercooler 103 in between. The intercooler is typically a shell-and-tube heat exchanger (not shown in detail) with water as the coolant. Hot water returning from the intercooler can be cooled in a cooling tower before being re-sent to the intercooler and completing the loop. Other configurations are also possible, including but not limited to useful heat energy extraction. The exact method of intercooling is not critical. Compressor discharge air is at 125 psia and 250° F. The power consumption of the turbo-compressor is about 50 MW.

Part of the compressor discharge air 24 is cooled in an after-cooler 104 to 150° F. The remainder of the discharge air 26 (about 17%) is sent to the turbine 201 for hot gas path component cooling. Cooled compressor discharge air 25 is sent to the air/gas intake of gas engine 300. The schematic diagram shows only a single box 300 for simplicity, i.e., implying only one gas engine. In a preferred embodiment three (3) gas engines are operated concurrently as element 300 in FIG. 4.

Figure 5:
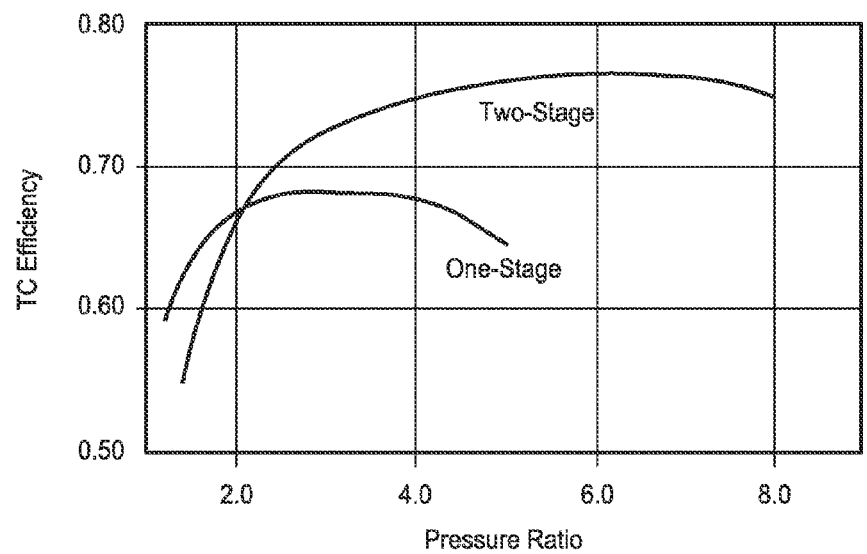
FIG. 5 is a plot of GE Jenbacher turbocharger (TC) efficiency as a function of compression pressure ratio [5].

The engine intake air is at 115 psia, which otherwise might have been achieved in a turbocharger, i.e., possibly a two-stage compressor unit with an intercooler and after-cooler, a pressure ratio of ~8, driven by an exhaust gas turbine. In modern gas engines such as GE Jenbacher's J920, two-stage turbocharging offers pressure ratios up to 10 and turbocharger efficiency up to 75%. See FIG. 5. The gas engine detailed in the numeric specifications herein, the 18V50SG, has a turbocharger with a single-stage compressor. No information is available in the public literature on the engine's supercharging pressure ratio (PR). A base (original equipment) PR value of 4 is assumed for the calculations herein. Thus, modification of the engine to employ the turbocompound system of the current invention, can nearly double the supercharging PR and squeeze a much higher air mass into the cylinders.

Engine intake airflow at 120 lb/s per engine (total of 360 lb/s for three engines) is estimated to be about 75% higher than its nominal design value due to higher compression. The engine piston compression ratio (originally 12) is estimated to be about 5 with exhaust gas discharged at 155 psia and 1,200° F. (~650° C.). The engine electric output is estimated at about 19 MW at generator 305 terminals with an efficiency of about 40%. This is somewhat below the original design value in Table 2). Estimated engine performance under such conditions might be confirmed ultimately in testing by the original equipment manufacturer (OEM). However, the estimated numbers quoted herein are believed to be conservative and therefore reasonably reliable.

An aim of the current invention is to configure a highly efficient and cost-effective compound power plant system that can be built from OEM components available of the shelf, with reasonable modifications, which enjoy improved total efficiency while obviating the need for exotic/expensive materials for the balance of plant (such as alloy pipes). In order to achieve this, there are several goals. Among others:
1. The exhaust gas pressure of the piston engine 300 should be high enough to allow a reasonably high gas turbine PR (about 9 to 10);
2. The exhaust gas temperature from the piston engine should to be low enough (~1,200° F.) to keep the cost of piping and heat exchanger tubing downstream at a reasonable level and ensure gas engine exhaust valve life.

Variable valve timing (VVT) controls can be applied such that the engine exhaust valves open at a point in the engine compression/combustion cycle that achieves a desired exhaust gas pressure. However, under normal engine operating conditions, the gas temperature at that point (140-160 psia) would be high, i.e., around 1,700° F. (925° C.). Combined with the high suction pressure described earlier, this requires careful evaluation of fuel injection and compression ratio to keep the cylinder maximum pressure and temperature at low enough levels to ensure that the gas temperature at the exhaust valve opening is at the desired level. It is expected that such a modification will reduce the GE efficiency (see Table 3). For the numerical example herein, the calculated cylinder maximum pressure and temperature are ~19 MPa and 1,500° C. vis-à-vis (estimated) 29 MPa and 1,950° C. for the original engine. (The output stays nearly the same due to much higher charge air mass.)

The exhaust gas from the gas engine 35 is sent to the heat exchanger 400. Note that there may be only one heat exchanger as shown in the diagram (in which case, stream 35 represents the total of three engines coming from a common exhaust gas header) or there may be three heat exchangers, each associated with a corresponding gas engine. The optimal configuration can be determined by a cost-performance trade-off analysis.

Figure 6:
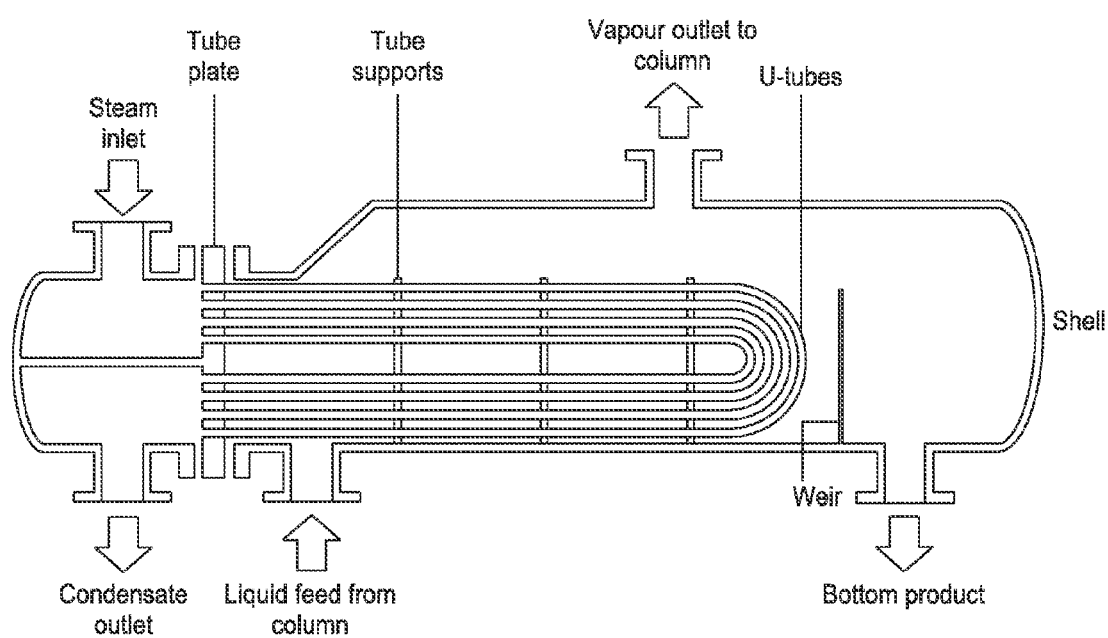
FIG. 6 is a longitudinal section through an exemplary kettle type reboiler for steam generation, with a shell and tube heat exchanger configuration apt for the embodiment disclosed in FIG. 4.

According to one embodiment of the invention, the heat exchanger 400 can comprise a kettle reboiler (KRB), which is a shell-and-tube type heat exchanger. Kettle reboilers are used to boil a liquid in a manner similar to operation of a tea kettle (hence the name kettle reboiler), typically with a wide boiling surface, utilizing the heat from a hot fluid flowing in U tubes immersed in the boiling liquid. An example is shown in FIG. 6. The name "reboiler" refers to their common use in chemical process industry, namely to re-boil a liquid from the bottom of a distillation column and re-send the vapor back into the column to drive the separation process.

While describing the system embodying the current invention and estimating its performance, an embodiment with a Rankine steam bottoming cycle is assumed as an exemplary but nonlimiting embodiment. In this case the boiling liquid is feedwater 61 from the bottoming cycle 500 (see FIG. 4). The hot fluid is exhaust gas from the gas engines 300 (at 1,200° F.), there preferably being three engines, which gas is cooled to 900° F. at the heat exchanger 400. The cooled gas 36 is sent to the combustor 202 of the gas turbine 200. Steam generated in the heat exchanger 400 comprising kettle reboiler 62 is sent back to the bottoming cycle 500. The steam pressure is expected to be 1,650 to 1,850 psia (i.e., high pressure steam). The operational parameters can be adjusted depending on the bottoming cycle optimization as a function of exhaust gas flow and temperature from the gas turbine.

The combustor 202 associated with turbine 201 effects the second (i.e., reheat) combustion of the exhaust gas from the piston engine 300. This combustor can be the same original equipment component of the OEM turbine such as a General Electric Frame 7EA (new designation 7E 3-series). However the expected operational parameters vary from nominal. Due to different airflow (about 30% less than in the original GT), oxygen content (13% vis-à-vis 21%), inlet air/gas temperature (900° F. vis-à-vis ~680-700° F.) and pressure (about 25% less), it is desirable to make some adjustments to the OEM unit to ensure stability and to limit emissions.

Hot combustion gas 41 from combustor 202 enters the turbine section 201 at the same temperature as in the original GT, i.e., about 2,175° F. for the E class. The power generated in the turbine is approximately proportional to the gas flow rate (30% less than typical of an original equipment standalone GT that is not compounded with engine 300) after accounting for the difference in the pressure ratio, i.e., about 8.5 vis-à-vis about 12 in the original GT. Typically, in a GT the turbine shaft power generation is roughly twice the net electric output, i.e. about 190 MW for the 7EA under consideration herein. With the aforementioned flow rate and PR, the same turbine generates about 116 MW at generator 205 terminals. Thus the combined shaft output of three gas engines and the gas turbine is about 174 MW (see Table 3).

TABLE 3

Modified gas engine and gas turbine performance data

|  |  | 3 × 18V50SG | 7EA |
| --- | --- | --- | --- |
| Shaft Power | MW | 58.0 | 116.0 |
| Electric Power | MW | 56.6 | 114.1 |
| Turbo-compressor (TC) | MW |  | 51.5 |
| Net Turbine + TC | MW |  | 63.4 |
| Efficiency |  | 40.0% | 40.3% |
| Heat Rate | Btu/kWh | 8,530 | 8,467 |
| Exhaust Flow | lb/s | 367 | 447 |
| Exhaust Temperature | F | 1,200 | 1,083 |

The exhaust gas 42 from the gas turbine 200 at 1,083° F. goes to the bottoming cycle 500 for final energy extraction and additional power generation. The exact bottoming cycle design including the HRSG, ST and the heat rejection system is not critical to this disclosure. Nevertheless, to enable a performance estimation with a typical bottoming cycle configuration, the following assumptions may be made:

A feasible HRSG design for the exhaust gas flow and temperature, including the extra steam generation in the kettle reboiler, is two-pressure reheat (2PRH)

A feasible steam cycle is 1,650 psia throttle, 350 psia hot reheat at 1,000° F./1,000° F. main/reheat steam temperatures (for a cost-effective HRSG design)

For rating purposes, the ST heat rejection system is a once-through (i.e., no cooling tower) water-cooled condenser with 1.2 inch of mercury pressure (i.e., access to a sufficiently cold cooling water source is assumed)

The ST is assumed to be state-of-the-art with 90% HP and 92.5% LP section efficiencies and 80 sq ft of exhaust annulus area to generate 56 MW (at generator 505 terminals)

Figure 7:
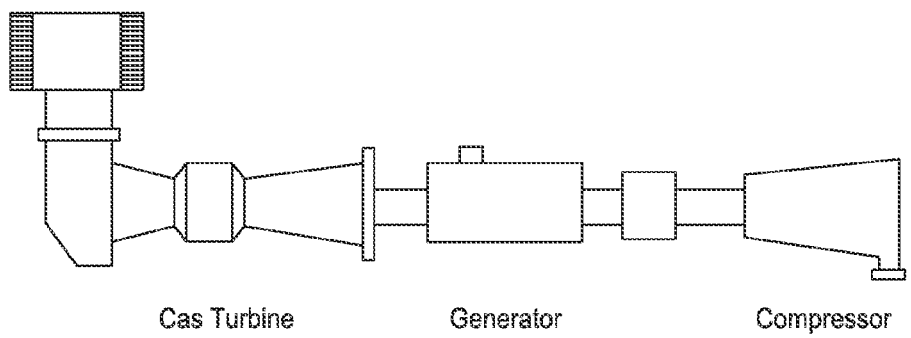
FIG. 7 is a schematic elevation showing an example of a single-shaft blast furnace gas (BFG) firing gas turbine power train configuration, according to one disclosed embodiment.

The plant auxiliary power consumption (inclusive of step-up transformers) is 3.5% of the ST generator A conservative 350 kW is bookkept for the cooling system of turbo-compressor intercooler and after-cooler circulating water In the embodiment shown in FIG. 4, turbo-compressor 100, generator 205 and turbine 201 are on the same shaft. This single-shaft configuration can be similar to the GT/GEN/FGC power train configuration originally developed by General Electric in 1990s for steel mill blast furnace gas (BFG) applications. (See Hall, J. M., Thatcher, R. T., et al., 2011, "Development and Field Validation of a Large-Frame gas Turbine Power Train for Steel Mill Gases," GT2011-45923, ASME Turbo Expo 2011, Vancouver, Canada, Jun. 6-10, 2011.) In this case, a Frame 9E gas turbine (a geometric scaling from 7E) is connected to the fuel gas compressor (FGC), which is a two-stage intercooled centrifugal unit, with the 9A5 generator (GEN) between the two (see schematic illustration in FIG. 7). This configuration has been applied in many steel mills in Europe and China (most recently in Wuhan and Handan).

Figure 8:
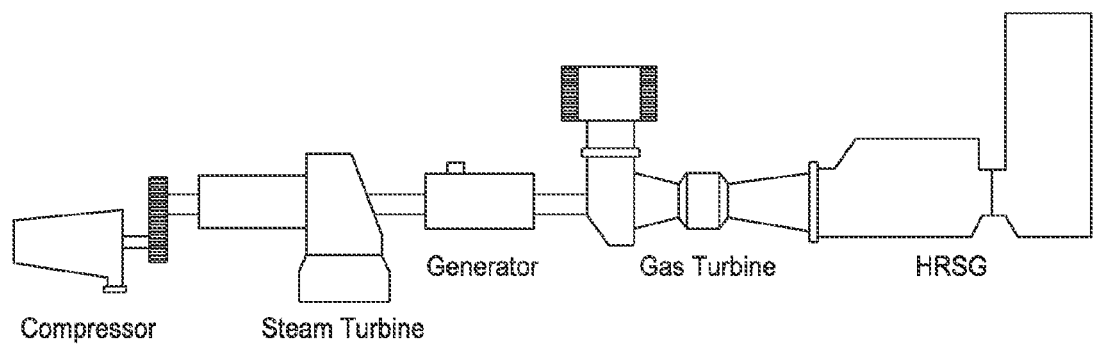
FIG. 8 is a schematic elevation showing an example of an in-line BFG firing gas turbine power train configuration, according to an alternative embodiment.

In alternative embodiments, other single-shaft configurations are possible; e.g., the power train equipment consisting of the gas turbine, generator, steam turbine and a single casing axial fuel-gas compressor (preferably coupled to the ST via a step-up gearbox) supplied by Mitsubishi Heavy Industries (MHI) for the Anshan BFG firing combined cycle power plant. See Otsuka, H., Tanaka, S., et al., 2007, "Anshan Iron & Steel Group Corporation, China, Construction and Operation Experience of 300 MW Blast Furnace Gas Firing Combined Cycle Power Plant," MHI Technical Review Vol. 44 No. 4 (December 2007). A similar configuration, shown in FIG. 8, can be applied to the present invention.

Yet another possible configuration is an electric motor-driven compressor, which is independent of the gas turbine or gas and steam turbine power train. This configuration improves compressor functioning during startups and low load operation, but at the added expense of a relatively large electric motor (51 MW). These and similar power train variations are possible depending on tradeoffs of cost, performance, operability and flexibility for the optimal design to satisfy the particular site requirements.

Figure 9:
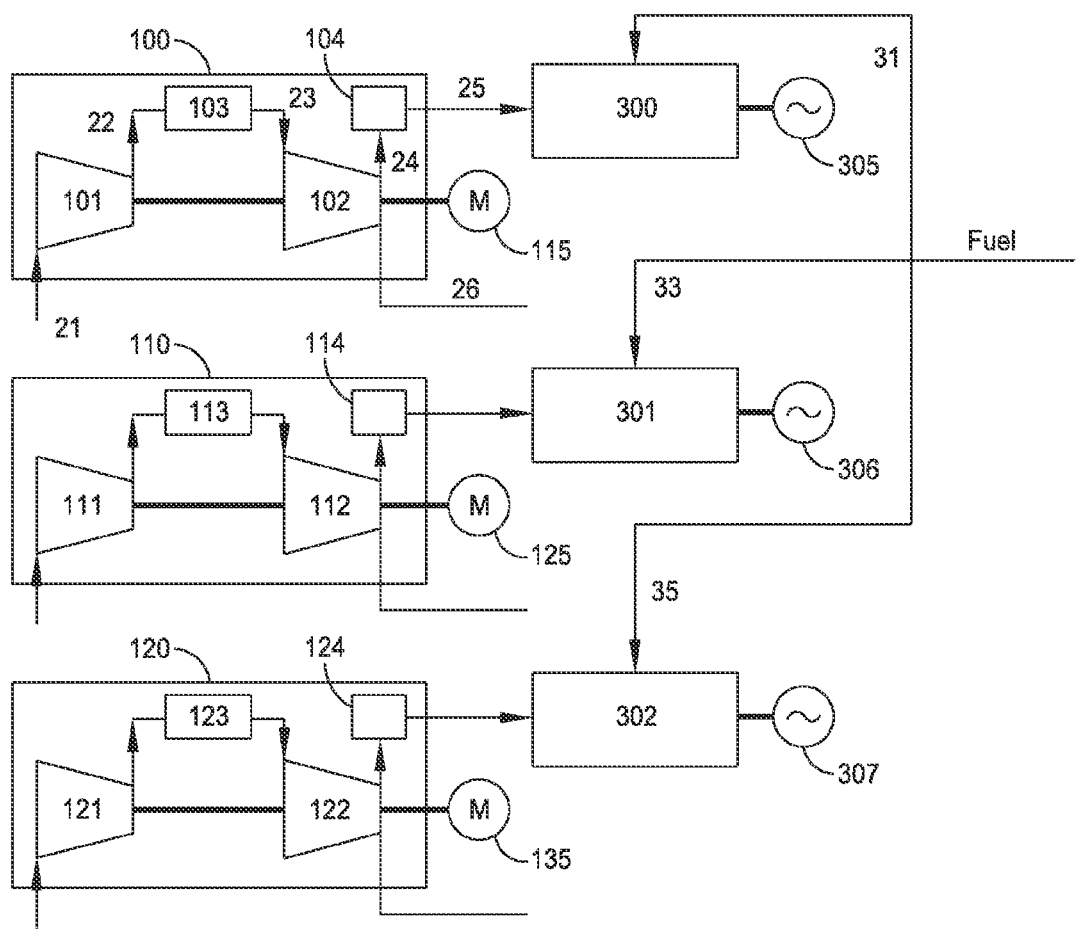
FIG. 9 is a schematic illustration of a multiple electric motor driven turbo-compressor configuration in parallel, according to a further embodiment.

In conjunction with a motor-driven unit (with or without a Variable Frequency Drive or VFD), a possible embodiment can be configured with multiple turbo-compressors—gas engine trains (or turbo-compressor—gas engine—kettle reboiler trains) instead of using a single turbo-compressor that is larger. See FIG. 9, illustrating a three gas engine system. In fact, single compressors of such a size (nearly 360,000 acfm at the suction) may be difficult to obtain "off-the-shelf" or require customized engineering effort and costs. As such, the availability and applicability of smaller units that can be used in a configuration of multiple units, may be preferable over using a larger unique machine, even if some economies of scale are not exploited.

In the embodiment shown in FIG. 9, each gas engine, 300, 301 and 302, is supplied by a separate turbo-compressor, 103, 113 and 123, respectively. Each compressor is driven by an electric AC motor, 115, 125 and 135, respectively. Motors can be fixed-speed units or their speed can be adjusted by a VFD by varying motor input frequency and voltage for optimal efficiency at off-design operating conditions. A multiple turbo-compressor configuration as shown is advantageous in terms of procurement of compressors and motors in relatively small capacities/sizes (each motor is about 17 MW and each compressor is sized at about 120,000 acfm). This configuration also has advantages for system startup and flexibility, e.g., so that individual units can be started or taken off line independently of the others.

Figure 10A:
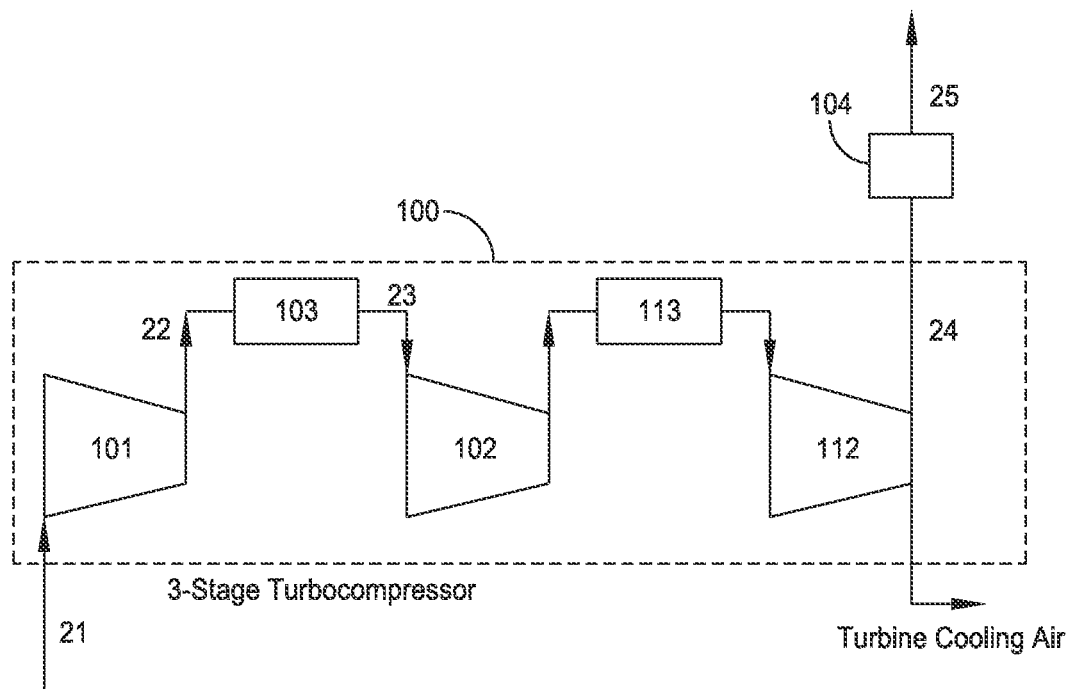
FIG. 10a is a schematic of a multiple stage serial turbo-compressor configuration according to another embodiment.
Figure 10B:
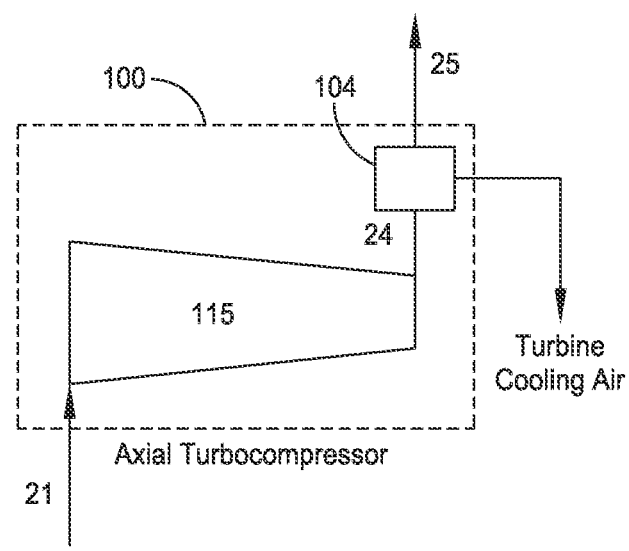
FIG. 10b is a schematic illustration of an alternative embodiment using an axial turbo-compressor.

The performance of the system is dependent on the turbo-compressor configuration and technology. The particular unit in the system diagram of FIG. 4 is a two-stage compressor with a single intercooler between the stages. There are other possible configurations; e.g., a three-stage compressor with two intercoolers (See FIG. 10a) or an axial compressor with no intercooling (See FIG. 10b). The term "stage" as used herein can refer either to an operational stage or a physical casing that has one or plural operational stages. Within a physical casing, for example, there may be one or several operational stages that each comprises a stationary row of blades (nozzles) and a rotating row of blades (buckets). These are also often referred to as the stators and rotors, respectively, within the casing. All such variations are within the scope of this disclosure.

Axial compressors have typically high efficiencies and are well suited to high flow applications up to around 100 psia (note that multistage axial compressors in aircraft or land-based industrial gas turbines often are designed for much higher pressure ratios and discharge pressures). Beyond that range, discharge temperatures become high and specialized seals may be needed. Axial compressors have typically low stage PRs (about 1.1 to 1.2) so they may require a large number of successive operational stages (about 10) to accomplish the desired pressure rise. While axial compressors are smaller than centrifugal compressors and more efficient, they also cost more. From an operability perspective, axial compressors have a narrow band of stable operation between their operating and surge lines.

Centrifugal compressors are perhaps more suitable to high-pressure, low-flow applications in multi-stage intercooled configurations. They have typically lower efficiencies than axial compressors on a stage-by-stage basis but the overall efficiency of a multistage intercooled unit is significantly higher than that of a multistage axial unit for the same pressure ratio and inlet conditions. (This is so because the overall compressor train performance with intercooling between stages approaches the isothermal compression ideal as the number of stages is increased.) Centrifugal compressors have a broader band of stable operation between their operating and surge lines. Operational flexibility of motor-driven units is enhanced by a VFD. In fixed-speed units (electric motor or prime mover driven), at low loads recirculation might be required to prevent surge. The following Table 4 compares the attributes and performance of exemplary turbo-compressor configurations that are apt for embodiments of the present invention.

TABLE 4

Performance summary of different turbo-compressor configurations

|  |  | Centrifugal | | Axial |
|---|---|---|---|---|
|  |  | 3-Stage | 2-Stage |  |
| Inlet Flow | acfm | 356,160 | 356,160 | 356,160 |
| Discharge Pressure | psia | 131 | 131 | 131 |
| Stage Pressure Ratio |  | 2.1 | 3.0 | 1.2 |
| Number of Stages |  | 3 | 2 | 10 |
| Overall Pressure Ratio |  | 9.0 | 9.0 | 9.0 |
| Stage Poly. Efficiency | % | 85 | 85 | 92 |
| Intercooler Disch. Temp. | F | 90 | 90 | N/A |
| Discharge Temperature | F | 292 | 398 | 590 |
| Shaft Power | MW | 51.6 | 54.6 | 57.5 |

A projected performance summary of the overall system is given in Table 5. The first three cases are based on an E class GT (e.g., GE's frame 7EA) with a TIT of 2,175° F. and three Wärtsila 18V50SG gas engines. The cases differ by their turbo-compressor technology (as summarized in Table 4). The last case is based on an F class GT (e.g., GE's frame 7FA) with a TIT of 2,475° F. Note that, due to the F class gas turbine's larger "swallowing capacity", this case is based on four Wärtsila 18V50SG gas engines. The turbo-compressor is a three-stage intercooled design.

TABLE 5

System performance (77° F. ambient—ISO 3046)

|  | Units | 7EA (3-Stage Centr.) | 7EA (2-Stage Centr.) | 7EA (Axial Comp.) | 7FA (3-Stage Centr.) |
|---|---|---|---|---|---|
| GT Shaft Output | kW | 116,024 | 116,590 | 116,023 | 207,672 |
| Turbo-compressor | kW | 51,567 | 54,591 | 57,508 | 84,619 |
| Net GT Output | kW | 63,386 | 60,950 | 57,503 | 121,324 |
| Number of GEs |  | 3 | 3 | 3 | 4 |
| GT + GE Output | kW | 119,992 | 117,556 | 114,109 | 204,310 |
| GT + GE Heat Rate | Btu/kWh | 8,465 | 8,641 | 8,902 | 8,320 |
| GT + GE Efficiency |  | 40.31% | 39.49% | 38.33% | 41.01% |
| GT Exhaust Flow | pps | 447.4 | 447.4 | 447.4 | 676.3 |
| Total Fuel Flow | pps | 15.44 | 15.44 | 15.44 | 25.81 |
| GT Exhaust Temp | F | 1,082.7 | 1,093.2 | 1,082.7 | 1,176.3 |
| KRB Gas Duty | Btu/s | 30,474 | 30,474 | 30,474 | 44,630 |
| ST Output Contribution | kW | 15,185 | 15,215 | 15,185 | 22,614 |
| ST Output | kW | 56,107 | 56,866 | 56,107 | 94,666 |
| Gross CC Output | kW | 176,099 | 174,422 | 170,216 | 298,976 |
| Auxiliary Load | kW | 2,332 | 2,368 | 2,385 | 3,918 |
| Net CC Output | kW | 173,767 | 172,054 | 167,831 | 295,058 |
| Heat Consumption | kW | 297,685 | 297,685 | 297,685 | 498,172 |
| Net CC Eff. |  | 58.37% | 57.80% | 56.38% | 59.23% |

Another possible choice for gas engine is GE Jenbacher's J920. This engine is rated at about 50% of Wärtsila's 18V50SG (9.5 MWe) with nearly the same efficiency, 48.7%. Thus, the performance listed in Table 5 can be obtained with six J920 gas engines (instead of three) using 7EA gas turbine and eight J920 gas engines (instead of four) using 7F gas turbine. While both 18V50SG and J920 are spark-ignited (SI) engines, the invention would work equally well with gas fired dual-fuel (DF) (compression ignition, CI) engines such as 18V50DF. In fact, a rigorous evaluation by the OEM may very well go in favor of a CI engine that would fit the requisite high suction/exhaust pressure cycle better than a SI engine, which is more sensitive to detonation problems (knocking).

Comparable combined cycle efficiencies for gas engine and gas turbine combined cycles are given in Table 6. Thus, with E class technology, the current invention results in a power plant with nearly 7 percentage point better efficiency than a comparable GTCC or GECC (in the case of the latter with nearly three times the capacity).

TABLE 6

Gas turbine (GTCC) and gas engine (GECC) combined cycle performances

|  | 7EA | 7FA | | | Wärtsila | |
|---|---|---|---|---|---|---|
|  | 7EA | Old | New | 20V34SG | 18V50DF |
| CC Configuration | 1 × 1 | 1 × 2 | 1 × 1 | 6 × 1 | 3 × 1 |
| TIT, ° F. | 2,300+ | 2,400+ | 2,500+ | N/A | N/A |
| Net Output | 135,550 | 262,600 | 277,276 | 57,000 | 54,500 |

TABLE 6-continued

Gas turbine (GTCC) and gas engine (GECC) combined cycle performances

|  | 7EA | 7FA Old | 7FA New | Wärtsila 20V34SG | Wärtsila 18V50DF |
|---|---|---|---|---|---|
| Net Efficiency | 51.1% | 56.0% | 57.7% | 50.7% | 51.8% |

Figure 11:
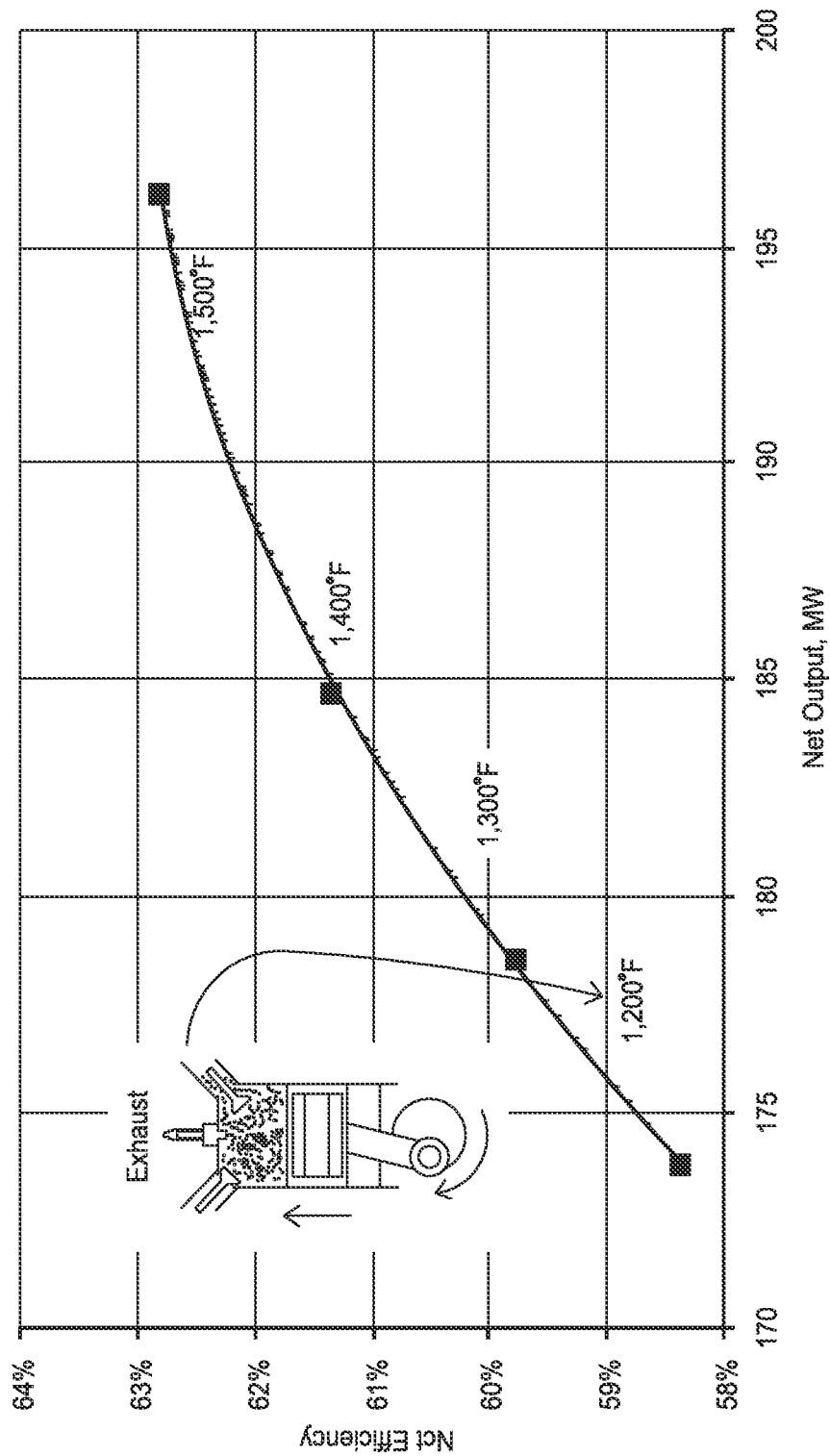
FIG. 11 is a plot comparing turbo-compound reheat net output and efficiency with increasing gas engine exhaust temperature for exemplary embodiments.

It should be emphasized that the performance in Table 5 does not reflect the entitlement for the current invention. It is based on 1,200° F. gas temperature at the exhaust of the gas engine, which allows for a feasible design with readily available materials and equipment at the expense of severely hampered gas engine efficiency. If one would allow higher gas engine exhaust temperatures, the performance would increase commensurately as shown in FIG. 11. The plot illustrates the increase in turbo-compound reheat GTCC net output and efficiency with increasing gas engine exhaust temperature for a system based on 7EA gas turbine and three-stage centrifugal compressor. A truly impressive 63% efficiency is possible with 1,500° F. exhaust gas from the gas engine with a gas turbine TIT of mere 2,175° F. The improvement in system performance is driven by (i) higher gas engine efficiency and (ii) higher heat recovery in the kettle reboiler by cooling the hot gas to 900° F. Expensive alloy piping and heat exchanger tube bundles are requisite to handle such high gas temperatures (in addition to gas engine valves that can withstand those temperatures). As such, mechanical design, material and/or cost considerations might ultimately prohibit to achieve the full thermodynamic performance entitlement of the current invention demonstrated in FIG. 11.

As mentioned earlier, in a modern heavy-duty industrial gas turbine, the ratio of the turbine to the compressor is approximately two to one. The advantage of the current invention is plainly demonstrated by extracting the same ratio from the data in Table 5, which is summarized in Table 7.

TABLE 7

Turbine/Compressor Power Ratios

|  | E Class | | F Class | |
|---|---|---|---|---|
| GT/TC | 2.25 | 2.14 | 2.02 | 2.45 |
| (GT + GE)/TC | 3.35 | 3.17 | 3.00 | 3.95 |

From a cost and performance perspective, a feasible choice for the bottoming cycle is a Rankine steam cycle. Nevertheless, a number of other possibilities have been proposed theoretically and tried at least on a demonstration scale if not full utility scale power generation capacity. For example, the bottoming cycle can be a Kalina cycle with a variable composition water-ammonia mixture as the working fluid. Another possibility is an organic Rankine cycle (ORC) with a suitable organic fluid as the working fluid. Yet another possibility is a supercritical $CO_2$ cycle. The particular type of the bottoming cycle is immaterial to the current invention as long as the exhaust gas from the gas turbine is the primary energy source for said bottoming cycle. The heat exchanger 400 is configured for the selected bottoming cycle; e.g., an ammonia-water vaporizer for Kalina, an organic fluid evaporator (most likely a KRB) for the ORC or a counter-flow heat exchanger to heat supercritical $CO_2$ working fluid. The choice of bottoming cycle is not critical to the current invention.

As disclosed herein, a power generation plant includes at least first and second combustion engines of different types, compounded to exploit their operating characteristics in a manner that improves fuel consumption efficiency. The first internal combustion engine (ICE) 300 is coupled to a combustion air intake 25 and operable to combust fuel in a partly confined volume, wherein the first ICE produces shaft torque, especially to an electric generator 305, and pressurized exhaust gas 35 from combustion of fuel, at a pressure higher than a pressure at the combustion air intake. The second internal combustion engine 200 combusts fuel in a continuous-flow configuration. An intake 36 to the second ICE 200 is coupled to the pressurized exhaust gas 35 from the first ICE 300. Thus the combustion gases at the intake to the combustor 202 of the second ICE 200 are pressurized by the pressurized exhaust from the first ICE. The second ICE 200 produces shaft torque from expansion of the combustion gases and likewise can operate an electric generator 205. The exhaust gas from the second ICE 200 has a temperature and a pressure that are reduced by the expansion of the combustion gases in the gas turbine 201 of the second ICE 200. A bottoming cycle 500 is coupled to extract and use heat energy from one or preferably both of the first and second ICEs. The bottoming cycle can operate a generator 505 from heat energy from at least one of the exhaust gas 35 from the first ICE via a heat exchanger 400, and from the exhaust gas 42 from the second ICE.

The first ICE 300 comprises a quasi-constant volume combustion apparatus such as a piston/cylinder engine. Inasmuch as fuel combustion is confined in cylinders during ignition, this sort of engine can produce elevated exhaust pressure as well as elevated exhaust temperature, as the results of combustion. Enhancing the pressure of the exhaust from the first ICE 300 advantageously produces a condition (higher pressure) carrying more energy forward to the second ICE 200, where the gas turbine 201 extracts mechanical energy by expanding combustion gas is a succession of turbine nozzles and rotary blades.

Advantageously, turbo-compressor 100 is coupled to the combustion air intake 25 of the first ICE 300. The turbo-compressor 100 can be driven by the shaft torque of the second ICE on a common drive shaft. Alternatively, the turbo-compressor can be driven from another associated drive shaft, or indirectly using an electric motor powered from the grid. In particular, the turbo-compressor is provided instead of a turbocharger on the intake of the first ICE 300. This avoids sapping energy in the form of pressure from the exhaust of the first ICE and reduces the need for cooling. In the embodiment of FIG. 4, the turbo-compressor 100 is a multi-stage unit with inter-coolers, coupled to a common shaft with the gas turbine 201 of the second ICE 200, for applying the shaft torque from the second ICE to compression of the combustion air intake of the first ICE. By compressing the intake air pressure to the first ICE 300, this configuration obtains greater power from the first ICE by injecting a larger volume of air and fuel for combustion, and also raise the pressure of the exhaust from the first ICE 300, which provides energy that the second ICE 200 later extracts by expanding the exhaust from the fuel combustor 202 in the gas turbine 201 of second ICE 200.

The piston/cylinder engine of the first ICE 300 can be based on an OEM engine with the combustion air intake to the first ICE 300 coupled to the turbo-compressor, which is provided in place of an original equipment turbocharger that has been removed or reconfigured to operate from shaft power other than a turbocharger exhaust turbine. Likewise, the second ICE 200 comprises an OEM gas turbine unit with a combustor 202 coupled to the pressurized exhaust gas from the first ICE in lieu of an original equipment compressor. The combustor burns a fuel and combustion gas mix that is expanded in the gas turbine 201 of the second ICE 200.

Unlike elevated pressure, the elevated temperature of the exhaust of the first ICE 300 is not advantageous if it detracts from the operation of combustor 202. According to another aspect, heat energy is extracted by heat exchanger 400 and transferred into the bottoming cycle 500 bypassing the exhaust path leading combustion gas into combustor 202. The heat exchanger 400 coupled between the first ICE 300 and the combustor 202 of the second ICE 200 is configured to extract heat energy from the pressurized exhaust gas from the first ICE with minimal pressure loss.

The subject invention may be considered a method for power generation or a method for configuring power generation apparatus, comprising the steps of providing a piston/cylinder first internal combustion engine (ICE) 300 operable to produce an exhaust flow 35 at elevated temperature and elevated pressure by combustion of air and fuel in a quasi-constant volume space, and generating mechanical torque on a first drive shaft; and coupling a gas turbine second internal combustion engine (ICE) 200 to the first ICE 300 in a compound configuration. A combustor 202 of the second ICE 299 is supplied with the exhaust flow from the first ICE 300 in lieu of combustion air. This supply is at elevated pressure and the second ICE combusts additional fuel. The second ICE 200 has a gas expansion turbine section 201 coupled to the 202 combustor for generating mechanical torque on a second drive shaft from combustion in the second ICE. The turbine section 201 reduces the temperature and pressure of combustion gas leading to an exhaust from the second ICE 200. A turbo-compressor 100 is driven from at least one of the first and second drive shafts for elevating a pressure of the combustion gas at an intake to the first ICE. The turbo-compressor increases the fuel combustion rate and contributes to the increased pressure of the exhaust of the first ICE 300.

Residual heat energy is transferred to a bottoming cycle coupled to operate another electric generator 505, achieving even greater efficiency in converting the fuel to useful energy. One source of residual energy is the heat energy remaining in the exhaust of the second ICE 200 after expansion of the exhaust gases from second ICE 200, which are directed to the bottoming cycle 500. Another apt source of heat energy is the exhaust of the first ICE 300. The can be extracted by a heat exchanger along the exhaust of the first heat exchanger and directed to the bottoming cycle 500.

Coupling of the gas turbine second ICE 200 to the piston/cylinder first ICE 300 in a compound configuration comprises connecting the combustion gas intake 36 of the combustor 202 of the second ICE 200 to an exhaust flow path 35 of the first ICE 400 without an intervening compressor, whereby the elevated pressure of the exhaust flow serves as a supply of compressed combustion gas to the combustion gas intake of the combustor 202.

More particularly, said coupling of the gas turbine second ICE and the piston/cylinder first ICE in the compound configuration comprises coupling the turbo-compressor 100 to the charge air and gas at the intake into the first ICE 300 without the use of a turbocharger powered by the first ICE and powering the turbo-compressor by the second ICE for compressing a combustion gas intake of the first ICE.

In the embodiment of FIG. 4, three distinct drive shafts are coupled to separate electric generators. It is also possible to couple devices on a smaller number of shafts, e.g., wherein at least two of the first, second and third drive shafts are commonly coupled by at least one of a direct connection and a transmission.

As discussed, transferring heat energy to the bottoming cycle comprises extracting heat from the exhaust of the first ICE 300 via a heat exchanger with a working fluid connection to the bottoming cycle. The heat exchanger advantageously reduces the temperature of the combustion gas inlet at the second ICE 200 to below the fuel ignition temperature. Heat energy is also coupled to the bottoming cycle from the residual heat in the exhaust of the second ICE 200 after expansion in the gas turbine 201. Natural gas is an advantageous combustion fuel for both the first and second ICE. Additional temperature management provisions are possible including extracting heat energy from the turbo-compressor using at least one cooler (an intercooler or after-cooler). Additionally, a portion of intake air compressed by the turbo-compressor 100 can be routed to the second ICE 201 for component cooling.

The invention has been explained in general and in particular, and exemplified with respect to a range of examples. However the invention is not intended to be limited to the particular embodiments disclosed as examples, and accordingly the scope of the invention should be determined with reference to the appended claims.

I claim:

1. A power generation plant, comprising:
   a first internal combustion engine (ICE) coupled to a combustion air intake and operable to combust fuel in a discontinuous flow configuration within a confined volume, wherein the first ICE produces shaft torque and exhaust gas from combustion of the fuel;
   a second internal combustion engine (ICE) operable to combust fuel in a steady-flow configuration, wherein an intake to the second ICE is coupled to the exhaust gas from the first ICE such that combustion gases at an intake to the second ICE are pressurized by the exhaust gas from the first ICE, wherein the second ICE produces shaft torque from expansion of the combustion gases, and exhaust gas from the second ICE has a temperature and a pressure that are reduced by said expansion of the combustion gases;
   a bottoming cycle coupled to at least one of the first and second ICEs, the bottoming cycle producing shaft torque by extracting heat energy from at least one of the exhaust gas from the first ICE and the exhaust gas from the second ICE;
   wherein at least one heat exchanger is coupled to transfer to the bottoming cycle heat energy from the exhaust gas from the first ICE;
   wherein the second ICE comprises a gas turbine configuration consisting essentially of a combustor and expander without an intake compressor, and wherein said expansion of the combustion gases in the second ICE produces an exhaust pressure and temperature that are lower than a temperature and pressure of the exhaust of the first ICE; and,
   wherein the shaft torques produced by the first and second ICE and by the bottoming cycle, respectively, are coupled to at least one electric power generator.

2. The power generation plant of claim 1, further comprising a turbo-compressor coupled to the combustion air intake of the first ICE, wherein the turbo-compressor is driven at least indirectly from the shaft torque from at least one of the first ICE and the second ICE.

3. The power generation plant of claim 2, wherein the turbo-compressor is coupled to a common shaft with the second ICE for applying the shaft torque from the second ICE to compression of the combustion air intake of the first ICE.

4. The power generation plant of claim 1, wherein the electric generator is coupled to a motor for driving the turbo-compressor.

5. The power generation plant of claim 1, wherein the first ICE comprises a piston/cylinder engine and the second ICE comprise a gas turbine.

6. A power generation plant, comprising:
a first internal combustion engine (ICE) comprising a piston/cylinder engine, and a second internal combustion engine (ICE) comprising a gas turbine, wherein the first ICE and second ICE are coupled in a compound configuration wherein exhaust from the first ICE is coupled directly into an intake of the second ICE and provides gas flow to the second ICE;
a bottoming cycle coupled to convert heat energy from at least an exhaust from the first ICE into shaft torque;
wherein the first ICE and second ICE provide shaft torque from combustion of fuel; and,
wherein the shaft torque from the first ICE, the second ICE and the bottoming cycle are coupled to at least one electric generator for generation of electric power.

7. The power generation plant of claim 6, further comprising a heat exchanger coupled between the first ICE and the combustor of the second ICE, the heat exchanger being configured to extract heat energy from the exhaust gas from the first ICE while maintaining a pressure thereof, and wherein the heat exchanger is coupled to supply said heat energy to the bottoming cycle.

8. The power generation plant of claim 2, wherein the turbo-compressor comprises plural compression stages and at least one of an inter-cooler between the stages and an after-cooler between the turbo-compressor and the first ICE.

9. The power generation plant of claim 6, wherein the bottoming cycle is coupled to convert heat energy from both the exhaust from the first ICE, and the exhaust from the second ICE, into said shaft torque.

10. A method for power generation, comprising:
providing a piston/cylinder first internal combustion engine (ICE) operable to produce an exhaust flow at elevated temperature and elevated pressure by combustion of air and fuel in a quasi-constant volume space, while generating mechanical torque on a first drive shaft;
coupling a gas turbine second internal combustion engine (ICE) to the first ICE in a compound configuration wherein a combustor of the second ICE is supplied with the exhaust flow from the first ICE in lieu of combustion air at said elevated pressure in which the second ICE combusts fuel, wherein the second ICE has a gas expansion section coupled to the combustor for generating mechanical torque on a second drive shaft from combustion in the second ICE, said expansion section reducing the temperature and pressure of combustion gas leading to an exhaust from the second ICE;
providing the exhaust flow from the first ICE to an inlet of the combustor of the second ICE, through a heat exchanger that extracts heat energy from the exhaust flow from the first ICE, thereby conserving the elevated pressure of the exhaust flow from the first ICE while limiting the elevated temperature of the exhaust flow at the inlet to the combustor;
driving a turbo-compressor from at least one of the first and second drive shafts for elevating a pressure of the combustion air at an intake to the first ICE;
transferring heat energy to a bottoming cycle, via the heat exchanger that extracts heat energy from the exhaust flow of the first ICE, and from the exhaust of the second ICE;
generating mechanical torque on a third drive shaft from said heat energy transferred to the bottoming cycle; and,
generating electrical power from the first, second and third drive shafts.

11. The method of claim 10, wherein said coupling of the gas turbine second ICE and the piston/cylinder first ICE in the compound configuration comprises connecting a combustion air intake of the combustor of the second ICE to an exhaust flow path of the first ICE without an intervening compressor, whereby the exhaust flow at the elevated pressure replaces compressed combustion air at an intake to the combustor.

12. The method of claim 10, wherein said coupling of the gas turbine second ICE and the piston/cylinder first ICE in the compound configuration comprises coupling the turbo-compressor to the first ICE without use of a turbocharger powered by the first ICE and powering the turbo-compressor by the second ICE for compressing a combustion gas intake of the first ICE.

13. The method of claim 10, wherein at least two of the first, second and third drive shafts are commonly coupled by at least one of a direct connection and a transmission.

14. The method of claim 10, wherein the temperature of the exhaust flow gas from the first ICE is above an ignition temperature of the fuel provided to the second ICE, and the heat exchanger is configured to reduce the temperature of the exhaust to below the ignition temperature, at the combustion gas inlet of the combustor of the second ICE.

15. The method of claim 14, comprising use of natural gas as the fuel in both the first ICE and the combustor of the second ICE.

16. The method of claim 10, further comprising extracting heat energy from the turbo-compressor using at least one cooler, and applying a portion of air compressed by the turbo-compressor to component cooling at the second ICE.

* * * * *